Patented Apr. 14, 1931

1,800,862

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF SEPARATING SECONDARY ALCOHOLS FROM PINE OIL

No Drawing.    Application filed July 8, 1927.    Serial No. 204,407.

My invention relates to a method for separating secondary alcohols, as borneol and fenchyl alcohol, from pine oil.

The method embodying my invention involves the treatment of pine oil with an organic acid such as will combine with the secondary alcohols, as borneol and fenchyl alcohol, to form either neutral or acid esters which are high boiling, thus permitting ready separation from the other components of the pine oil.

The method in accordance with my invention may be applied to pine oil without previous treatment, but it is usually preferable to (1) preliminarily fractionate the pine oil to obtain for treatment cuts in which the secondary alcohols are concentrated, i. e. a cut having a boiling range between about 195° C. and 205° C. for fenchyl alcohol and a cut having a boiling range between about 208° C. and 214° C. for borneol, or (2) partially dehydrate the pine oil, as by distilling the pine oil with, for example, iodin, certain acids, fuller's earth, etc., to remove the terpineols, as terpenes, and then treating the residue for the recovery of the secondary alcohols. Dehydration of the tertiary alcohols in the pine oil may be effected by heating the pine oil with certain organic acids, e. g., tartaric or oxalic, yielding terpenes and water which are allowed to distill off; the secondary alcohols are then esterified by the acid. When it is desired to separate the secondary alcohols as neutral esters rather than as acid esters, it is preferable that fractionated or dehydrated pine oil be treated rather than ordinary pine oil.

In carrying out the method according to my invention, organic acids such as tartaric, oxalic, phthalic, citric, malic, cinnamic, salicylic, benzoic, etc., and the higher fatty acids as stearic, palmitic, etc., may be used.

The organic acid used should preferably be anhydrous. However, if the acid contains water of crystallization, the water may be distilled off from the mixture of acid and pine oil, along with a small proportion of the pine oil.

As an example of the practical application of the method embodying my invention, for example, to effect the separation of the secondary alcohols, the pine oil cut is treated with an organic acid in an amount equal to approximately from 10%–200% of the weight of the pine oil. The amount of acid used will depend upon the amount of the secondary alcohols, the organic acid used, and whether the acid or neutral ester is desired. The heating of the pine oil and organic acid may be at a temperature within the range from about 125° C. to about 175° C. and may be carried on preferably under reduced pressure to assist in the elimination of water. The period of heating may range from about 5 to about 30 hours.

The above treatment will yield the acid ester if a di- or higher basic acid is used. Therefore, if it is desired to effect the separation of the neutral ester of a dibasic acid an esterification catalyst, such, for example, as dry hydrogen chloride, boric anhydride, anhydrous sodium acetate, etc., should be employed. Where, for example, hydrogen chloride is employed, any water present in the acid or in the pine oil should be removed by a preliminary heating before addition of the hydrogen chloride. When the neutral ester is desired, hydrogen chloride, for example, is passed into the pine oil after preliminary heating, for a short period of time, increasing the weight of the pine oil perhaps three per cent. In the event that the odor of hydrogen chloride disappears from the pine oil before the end of the heating period, an addition of hydrogen chloride should be made.

At the completion of the heating period the mass is washed with water and then treated with an excess of dilute, aqueous alkali, preferably a dilute, aqueous solution of sodium carbonate, and the alkaline solution is separated from the oil and neutral ester layer. The latter is washed with water. The acid esters may be precipitated from the alkaline solution by the addition to the solution of a dilute mineral acid, as for example, sulphuric, hydrochloric, etc.

The neutral esters will remain dissolved in the residual pine oil in the event a considerable proportion of the latter is present. The neutral esters are recovered in solid form by distilling off the pine oil. In addition to the neutral fenchyl ester and neutral bornyl ester, the neutral products formed from dibasic acids will contain some of the neutral mixed fenchyl and bornyl ester.

Other types of mixed neutral esters of borneol or of fenchyl alcohol may be prepared by taking the acid ester and introducing an aryl or alkyl radical. Thus, fenchyl acid tartrate may be dissolved in aqueous sodium hydroxide and refluxed with benzyl chloride, yielding benzyl fenchyl tartrate.

The borneol and fenchyl alcohol can then be recovered by saponification of either the acid or the neutral esters by any convenient method, but preferably by saponification with alcoholic sodium hydroxide, with subsequent steam distillation which will yield an oil containing fenchyl alcohol and some crystalline borneol which may be separated by filtration, refrigeration and fractionation.

As a more specific example of the practical application of the method embodying my invention 500 grams of the residue from the partial dehydration of pine oil by distillation with, for example, 2% of fuller's earth, and from which the borneol has been partially removed by filtration at about 15° C., is heated with 100 grams of tartaric acid for a period of five hours at a temperature of 140° C. under 26 inches pressure of mercury. Dry hydrogen chloride is then passed into the solution for a period of four hours and the heating at 140° C. under 26 inches pressure resumed and continued for twenty hours. The mass is washed with water and then treated with a dilute aqueous solution of sodium carbonate and the neutral tartrates of borneol and fenchyl alcohol separated from the residual pine oil. The above process will produce about 275 g. of residual pine oil and 185 g. of neutral tartrates distilling mainly within approximately the range 200° C.-260° C. under about 25 mm. mercury pressure. These tartrates are excellent solvents for nitrocellulose. The residual pine oil also has the capacity for colloiding nitrocellulose. The residual pine oil contains appreciable amounts of camphor. Methyl chavicol and anethol also are present, and may be separated from the oil by fractionation.

Mixed neutral oxalates of borneol and fenchyl alcohol may be prepared by heating with 250 g. of oxalic acid, for example, 1200 g. of the residue, from the distillation of pine oil, with for example, fuller's earth. The pine oil residue and oxalic acid are first preliminarily heated at a temperature within about the range 100° C.-120° C. in order to remove the water. The hydrogen chloride is then passed into the mass and the heating resumed. The mass, after the heat treatment, is washed with water, treated with an alkali solution, and 420 g. of the neutral oxalate esters of borneol and fenchyl alcohol separated and recovered.

The following example of combined dehydration and esterification may be given. 500 g. of pine oil was heated to 150° C.-175° C. for 6 hours with 100 g. of tartaric acid. Dehydration of the tertiary alcohols resulted; there distilled off 320 g. of terpenes B. P. 175-190° C. The residual oil yielded 50 g. of the tartrate esters of the secondary alcohols in the pine oil.

The neutral fenchyl ester of tartaric acid may be prepared by heating tartaric acid with fenchyl alcohol in the presence of an esterification catalyst. Thus, 5 parts of tartaric acid were heated with 12 parts of fenchyl alcohol (B. P. 201-2° C., freezing point 35° C.) for 15 hours to around 140° C. in the presence of about 2% of dry hydrogen chloride. The reaction mass is then dissolved in benzene, washed with sodium carbonate solution and the benzene evaporated, leaving 8.5 g. of neutral fenchyl tartrate. A portion of the latter is refined by distillation under reduced pressure, and will distill at 240-250° C. under about 25 mm. pressure. Another portion, after crystallization from alcohol, has a melting point of 152° C.

It will now be observed that by virtue of my invention a method is provided by which fenchyl alcohol and borneol may be separated from pine oil either in the form of neutral, or acid esters, and further, that by virtue of my invention there are provided new and valuable colloiding agents for nitrated carbohydrates, as nitrocellulose and nitrostarch, comprising a neutral mixed fenchyl and bornyl ester, the neutral esters of dibasic acids containing a fenchyl radical, the fenchyl esters of monobasic organic acids and also the unattacked, or residual pine oil remaining after the separation therefrom of the secondary and tertiary alcohols.

It will be understood that where in the claims appended hereto I utilize the term "pine oil" that I intend to include a cut, or cuts, rich in secondary alcohols as fenchyl alcohol and borneol, or either, and also the residue remaining after the partial dehydration of pine oil with a catalyst as iodin, fuller's earth, acids, etc., as well as ordinary pine oil.

Having now fully described my invention, what I claim and desire to protect by Letters Patent is:—

1. The method of separating secondary alcohols from pine oil, which includes treating the pine oil to effect conversion of tertiary alcohols into terpenes and water, separating out the terpenes and separating the secondary alcohols from the residual pine oil by heating of the pine oil with a carboxylic organic acid having a melting point above about 25° C.

2. The method of separating secondary alcohols from pine oil, which includes heating pine oil with a carboxylic organic acid having a melting point above 25° C.

3. The method of separating secondary alcohols from pine oil, which includes heating pine oil with a dibasic organic acid.

4. The method of separating secondary alcohols from pine oil, which includes heating the pine oil with a dibasic organic acid to effect dehydration of its tertiary alcohols and esterfication of its secondary alcohols.

5. The method of separating secondary alcohols from pine oil, which includes heating the pine oil with an esterification catalyst and a carboxylic organic acid.

6. The method of separating secondary alcohols from pine oil, which includes heating the pine oil with an esterification catalyst and a dibasic organic acid.

7. The method of separating secondary alcohols from pine oil, which includes treating the pine oil to effect conversion of tertiary alcohols into terpenes and water, separating out the terpenes, and then heating the residual pine oil to effect esterification of the secondary alcohols.

8. The method of separating secondary alcohols from pine oil, which includes treating the pine oil to effect conversion of tertiary alcohols into terpenes and water, separating out the terpenes, and then heating the residual pine oil with a carboxylic organic acid.

9. The method of separating secondary alcohols from pine oil, which includes treating the pine oil to effect conversion of tertiary alcohols into terpenes and water, separating out the terpenes and then heating the residual pine oil with an esterification catalyst and a dibasic organic acid to form neutral esters of the secondary alcohols.

10. The method of separating secondary alcohols from pine oil, which includes treating the pine oil to effect conversion of tertiary alcohols into terpenes and water, separating out the terpenes and then heating the residual pine oil with hydrogen chloride and a dibasic organic acid.

11. The method of separating secondary alcohols from pine oil, which includes adding a carboxylic organic acid, preliminarily heating the pine oil, heating the pine oil with an esterification catalyst, then heating the pine oil to form esters of the secondary alcohols and separating the esters formed from the residual pine oil.

12. The method of separating secondary alcohols from pine oil, which includes treating the pine oil to effect conversion of tertiary alcohols into terpenes and water, separating out the terpenes and then heating the pine oil with a carboxylic organic acid to form esters of the secondary alcohols and separating the esters formed from the residual pine oil.

13. The method of separating secondary alcohols from pine oil, which includes fractionating the pine oil to obtain a cut rich in secondary alcohols, heating said cut with a carboxylic organic acid to form esters of the secondary alcohols and separating the esters formed from the residual oil of the cut.

14. The method of separating secondary alcohols from pine oil, which includes fractionating the pine oil to obtain a cut rich in secondary alcohols, treating the cut with an esterification catalyst, heating the cut with a dibasic organic acid to form esters of the secondary alcohols and separating the esters formed from the residual oil of the cut.

15. The method of separating secondary alcohols from pine oil, which includes heating pine oil with a carboxylic organic acid to a temperature within the range from about 125° C. to about 175° C. for a period of from about 5 hours to about 30 hours, to form esters of the secondary alcohols and separating the esters formed from the residual pine oil.

16. The method of separating secondary alcohols from pine oil, which includes adding a dibasic organic acid to pine oil, treating with an esterification catalyst, heating to a temperature within the range from about 125° C. to about 175° C. for a period of from about 5 hours to about 30 hours to form neutral esters of the secondary alcohols and separating the neutral esters from the residual pine oil.

17. The method of separating secondary alcohols from pine oil, which includes heating pine oil with a carboxylic organic acid to a temperature within the range from about 125° C. to about 175° C. for a period of from about 5 hours to about 30 hours to form esters of the secondary alcohols, treating the mass with an aqueous alkali solution, separating esters and residual oil from the alkali solution, treating the alkaline solution with a mineral acid to free acid esters and extracting the acid esters with a volatile solvent which is immiscible with water and separating the solvent from the esters.

18. The method of separating borneol from pine oil, which includes fractionating pine oil to obtain a cut boiling within the range from about 208° C. to about 214° C., heating said cut with a carboxylic organic acid to form an ester of borneol and separating the ester from the residual oil of the cut.

19. The method of separating borneol from pine oil, which includes fractionating pine oil to obtain a cut boiling within the range from about 208° C. to about 214° C., treating said cut with an esterification catalyst, heating said cut with a dibasic organic acid to form an ester of borneol and separating the ester from the residual oil of the cut.

20. As a colloiding agent for nitrocellulose, a mixture of the neutral esters of the secondary alcohols derived from pine oil.

21. As a colloiding agent for nitrated cellulose, a neutral mixed ester containing both a fenchyl and a bornyl radical.

22. As a colloiding agent for nitrocellulose, a neutral mixed ester of a dibasic acid containing a fenchyl radical.

23. As a colloiding agent for nitrocellulose, the neutral fenchyl ester of tartaric acid.

In testimony of which invention, I have hereunto set my hand, at Kenvil, N. J., on this 27th day of June, 1927.

IRVIN W. HUMPHREY.